US009567236B2

(12) United States Patent
Fu et al.

(10) Patent No.: US 9,567,236 B2
(45) Date of Patent: *Feb. 14, 2017

(54) RUTILE TITANIUM DIOXIDE NANOPARTICLES AND ORDERED ACICULAR AGGREGATES OF SAME

(71) Applicant: Cristal Inorganic Chemicals Switzerland Ltd, Baar (CH)

(72) Inventors: Guoyi Fu, Ellicott City, MD (US); Mark B. Watson, Kensington, MD (US)

(73) Assignee: Cristal Inorganic Chemicals Switzerland Ltd., Baar (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/775,810

(22) PCT Filed: Mar. 14, 2014

(86) PCT No.: PCT/IB2014/001173
§ 371 (c)(1),
(2) Date: Sep. 14, 2015

(87) PCT Pub. No.: WO2014/140910
PCT Pub. Date: Sep. 18, 2014

(65) Prior Publication Data
US 2016/0023917 A1    Jan. 28, 2016

Related U.S. Application Data

(63) Continuation of application No. 13/841,666, filed on Mar. 15, 2013, now Pat. No. 8,932,556.

(51) Int. Cl.
*C01G 23/053*     (2006.01)
*C01G 23/047*     (2006.01)

(52) U.S. Cl.
CPC ......... *C01G 23/0538* (2013.01); *C01G 23/047* (2013.01); *C01G 23/053* (2013.01); *C01G 23/0536* (2013.01); *C01P 2002/60* (2013.01); *C01P 2002/72* (2013.01); *C01P 2004/03* (2013.01); *C01P 2004/10* (2013.01); *C01P 2004/45* (2013.01); *C01P 2004/64* (2013.01); *C01P 2006/12* (2013.01)

(58) Field of Classification Search
CPC . C01G 23/047; C01G 23/053; C01G 23/0536; C01G 23/0538
USPC .................. 428/402; 423/610, 611
See application file for complete search history.

(56) References Cited

U.S. PATENT DOCUMENTS

| 8,932,556 | B2* | 1/2015 | Fu ......................... C01G 23/047 423/610 |
| 2007/0190324 | A1* | 8/2007 | Hayashi ................... A61K 8/29 428/402 |
| 2010/0080752 | A1* | 4/2010 | Hayashi ................... A61K 8/29 423/610 |
| 2011/0059315 | A1* | 3/2011 | Vakayil .................. B82Y 30/00 428/402 |
| 2012/0132515 | A1* | 5/2012 | Ohno ..................... B01J 21/063 204/157.6 |

FOREIGN PATENT DOCUMENTS

| EP | 1785398 | * | 5/2007 |
| EP | 1785398 A1 | | 5/2007 |

OTHER PUBLICATIONS

PCT/IB2014/001173—WO/2014/140910—International Search Report and Written Opinion, mailed Nov. 4, 2014, 12 pages.
Berhe et al., "Influence of Seeding and Bath Conditions in Hydrothermal Growth of Very Thin Single-Crystalline Rutile TiO2 Nanorod Films," ACS Applied Materials & Interfaces, vol. 5, No. 4, pp. 1181-1185, Feb. 27, 2013.
Zhang et al., "Rutile Ti02 microspheres with exposed nano-acicular single crystals for dye-sensitized solar cells," Nano Research, vol. 4, No. 10, pp. 938-947, Oct. 23, 2011.
Hsu et al., "Nonaqueous seeded growth of flower-like mixed-phase titania nonstructures for photocatalytic applications," Journal of Solid State Chemistry, vol. 183, No. 9, pp. 1917-1924, Sep. 1, 2015.

* cited by examiner

*Primary Examiner* — Leszek Kiliman (57) ABSTRACT

Ordered acicular aggregates of elongated $TiO_2$ crystallites which resemble nano-sized flower bouquets and/or triangular funnels, and process for their preparation by thermally hydrolyzing a soluble $TiO_2$ precursor compound in aqueous solution in the presence of a morphology controlling agent selected from carboxylic acids and amino acids.

12 Claims, 5 Drawing Sheets

RUTILE TITANIUM DIOXIDE NANOPARTICLES AND ORDERED ACICULAR AGGREGATES OF SAME

CROSS-REFERENCE TO RELATED APPLICATIONS

This application is a national stage application filed under 35 USC §371 of PCT/IB2014/001173, filed Mar. 14, 2014; which claims the benefit of U.S application Ser. No. 13/841,666, filed Mar. 15, 2013. The entire contents of the above-referenced patent applications are hereby expressly incorporated herein by reference.

BACKGROUND OF THE INVENTION

The present invention relates to a novel chemical structure comprising rutile titanium dioxide ($TiO_2$) nanoparticles, and, more particularly, to ordered acicular aggregates of elongated $TiO_2$ crystallites which resemble nano-sized flower bouquets and/or triangular funnels.

Titanium dioxide ($TiO_2$) is known as a typical solid compound having photocatalytic activity and having utility in electronic, photovoltaic and photonic applications. Rutile and anatase crystal forms are known as major crystal forms of $TiO_2$ which display higher chemical stability and larger refractive indices than those of amorphous $TiO_2$. It has also been recognized that $TiO_2$ particles having a high degree of crystallinity can exhibit a desirable level of photocatalytic activity.

U.S. Patent Publication No. 2012/0132515, for example, describes rutile $TiO_2$ nanoparticles wherein each has an exposed crystal face, making the nanoparticles useful as a photocatalyst and oxidation catalyst. The $TiO_2$ nanoparticles are produced by subjecting a titanium compound to a hydrothermal treatment in an aqueous medium in the presence of a hydrophilic polymer, which is polyvinylpyrrolidone. The titanium compound, when hydrothermally treated in an aqueous medium, generally gives a rod-like crystal of rutile titanium dioxide having (110) and (111) faces. However, when hydrothermally treated in an aqueous medium in the presence of polyvinylpyrrolidone, the rod-like crystal which results exhibits a novel exposed crystal face (001). It is noted that the hydrophilic polymer acts as a steric stabilizer or capping agent to thereby prevent aggregation of the rod-like crystals of rutile titanium dioxide.

The need exists for improved methods for producing novel types of rutile titanium dioxide ($TiO_2$) nanoparticles which have high surface areas, e.g., in the range of from 120 $m^2$/g to 160 $m^2$/g, and high refractive indices for improved UV blocking capability and which demonstrate high performance levels in catalysis, e.g., biomass conversion, and in electronic applications, such as lithium ion batteries and fuel cells.

SUMMARY OF THE INVENTION

The described and claimed inventive concepts(s) comprise in one embodiment a method for preparing a novel form of rutile $TiO_2$ nanoparticles which are ordered acicular aggregates of elongated $TiO_2$ crystallites. The elongated $TiO_2$ crystallites are rod-like, e.g., slender and/or needle-like, having a thickness of from 3 nm to 5 nm and a length which can vary from 20 nm up to 50 nm, although longer and shorter lengths may also be present. However, the elongated $TiO_2$ crystallites assemble together during the process in a manner which results in ordered acicular aggregates that resemble nano-sized flower bouquets or triangular funnels. The largest dimension of the funnel-shaped nano-particles is about 100 nm.

The method comprises:

(a) forming an aqueous solution of a soluble titanium compound at a titanium concentration of from 0.1 to 1.5 moles per liter, although a concentration range of from 0.5 to 1.0 moles per liter is preferred, optionally in the presence of a mineral acid;

(b) introducing a morphology controlling agent, or a mixture thereof, selected from an α-hydroxy carboxylic acid of the formula R—CH(OH)COOH, an α-hydroxy carboxamide of the formula R—CH(OH)CONH$_2$, or an α-amino acid of the formula R—CH(NH$_2$)COOH, wherein R is an alkane, alkene, alkyne, arene, or cycloalkane group having 6 or more carbon atoms, into the solution at an acid- or carboxamide-to-titanium molar ratio of from 0.02 to 0.2 while simultaneously heating the solution to a temperature in the range of from 60° C. to 80° C. with constant stirring;

(d) introducing $TiO_2$ seeds into the stirred solution at a seed-to-$TiO_2$ molar ratio of from 0.0005 to 0.0015 and maintaining the stirred solution at a temperature in the range of from 60° C. to 80° C. for a period of from one to 3 hours;

(e) elevating the temperature of the stirred solution to a value of from 100° C. to the refluxing temperature and maintaining said temperature for a period of from 2 hours to 4 hours to form a reaction product;

(f) cooling the reaction mixture from step (e) to room or ambient temperature;

(g) optionally neutralizing the reaction mixture; and (h) separating and drying the reaction product.

The reaction product can then be calcined. Calcining, which can be adjusted over a wide range for time and temperature, operates to enhance the properties of the resulting nanoparticles by expanding or opening the pore structure and/or increasing the refractive index.

Soluble titanium compounds useful according to the described method include, but are not limited to, titanium oxychloride ($TiOCl_2$), titanium oxybromide ($TiOBr_2$), titanium oxyiodide ($TiOI_2$), titanium oxynitrate ($TiO(NO_3)_2$), titanium trichloride ($TiCl_3$), titanium tribromide($TiBr_3$), titanium oxalate ($Ti_2(C_2O_4)_3$), potassium hexafluorotitanate ($K_2TiF_6$), ammonium hexafluorotitanate (($NH_4)_2TiF_6$), potassium titanyloxolate ($K_2TiO(C_2O_4)_2$), ammonium titanyloxolate (($NH_4)_2TiO(C_2O_4)_2$), titanium bis(ammonium lactate) dihydroxide ($[CH_3CH(O)COONH_4]_2Ti(OH)_2$), and mixtures thereof.

Morphology controlling agents as described above with R groups having 6 or more carbon atoms include, but are not limited to, mandelic acid ($C_6H_5CH(OH)COOH$), 4-hydroxymandelic acid ($C_6H_4(OH)CH(OH)COOH$), benzilic acid (($C_6H_5)_2C(OH)COOH$), 2-hydroxy-4-phenylbutyric acid ($C_6H_5CH_2CH_2CH(OH)COOH$), 2-hydroxy-2-phenylpropionic acid (($C_6H_5)(CH_3)C(OH)COOH$), 2-hydroxyoctanoic acid ($CH_3CH_2CH_2CH_2CH_2CH_2CH(OH)COOH$), mandelamide ($C_6H_5CH(OH)CONH_2$), phenylalanine ($C_6H_5CH_2CH(NH_2)COOH$), tyrosine ($C_6H_4(OH)CH_2CH(NH_2)COOH$), and combinations and mixtures thereof. In addition, ammonium ($NH_4+$), sodium ($Na+$) and potassium ($K+$) salts of the above-listed α-hydroxy carboxylic acids (R—CH(OH)COOH) may also be used with satisfactory results.

The described and claimed inventive concepts(s) embrace, in a second embodiment, novel rutile $TiO_2$ nanoparticles which are produced by the described method. The rutile TiO$_2$ nanoparticles, i.e., the reaction product, are ordered acicular aggregates of elongated, i.e., rod-like, TiO$_2$ crystallites. The individual crystallites have a thickness in the range of from 3 nm to 5 nm, and one end of each of the rod-like crystallites are joined, i.e., assembled, into a cluster such that the opposite ends of each of the crystallites extend, or fan, outwardly in the general shape of a nano-sized flower bouquet or a funnel. The funnel-shaped structures have a diameter in the range of 50 nm and a height in the range of from 50 nm to 100 nm.

Novel rutile TiO$_2$ nanoparticles obtainable according to the inventive concept(s) described and claimed herein can be deployed in a wide variety of applications, including, but not limited to, UV blocking, catalysis, photocatalysis, and in electronic, photovoltaic and photonic applications.

DETAILED DESCRIPTION OF THE INVENTION

The novel rutile TiO$_2$ nanoparticles, meaning the ordered acicular aggregates, are prepared by thermally hydrolyzing a soluble TiO$_2$ precursor compound, or a mixture of such compounds, in aqueous solution in the presence of a morphology controlling agent, or a mixture of morphology controlling agents, under specific conditions. The term "acicular" as used herein refers to a crystal habit composed of a radiating mass of slender, needle-like crystals, and the term "novel rutile TiO$_2$ nanoparticles" as used herein is intended to mean the ordered acicular aggregates of the needle-like TiO$_2$ crystallites.

The process is a wet chemical hydrolysis method in which the structure of the ordered acicular aggregates is controlled using a morphology controlling agent selected from (i) an α-hydroxy carboxylic acid of the formula R—CH(OH)COOH, (ii) an α-hydroxy carboxamide of the formula R—CH(OH)CONH$_2$, or (iii) an α-amino acid of the formula R—CH(NH$_2$)COOH, wherein R is an alkane, alkene, alkyne, arene, or cycloalkane group having 6 or more carbon atoms.

The process begins by forming an aqueous solution of a soluble titanium compound at a titanium concentration of from 0.1 to 1.5 moles per liter, but preferably 0.5 to 1.0 moles per liter, optionally in the presence of a mineral acid. Distilled or deionized water can be used to form the aqueous solution, and a mineral acid, e.g., hydrochloric acid (HCl), can be introduced as needed for controlling the rate of hydrolysis.

The morphology controlling agent, or a mixture thereof, is introduced into the solution at an acid- or carboxamide-to-titanium molar ratio of from 0.02 to 0.4, although best results have been observed when the ratio is from 0.02 to 0.2. The solution is simultaneously heated to a temperature in the range of from 60° C. to 80° C. with constant stirring. Thereafter, TiO$_2$ seeds are introduced into the stirred solution at a seed-to-TiO$_2$ molar ratio of from 0.0005 to 0.0015, and the stirred solution is maintained at a temperature in the range of from 60° C. to 80° C. for a period of from one to 3 hours. The TiO$_2$ seeds can conveniently comprise a slurry of TiO$_2$ in the anatase phase (available from Millennium Inorganic Chemicals), but other TiO$_2$ nucleating agents can also be used with satisfactory results.

The temperature of the stirred solution is next elevated to a value of from 100° C. to the refluxing temperature and maintained at that level for a period of from 2 hours to 4 hours during which time a reaction product is formed. The solution, i.e., reaction mixture which results, is then cooled to room or ambient temperature, and, optionally, it can be neutralized, e.g., pH of from 5 to 8, with introduction of a base, such as an ammonia solution or a sodium hydroxide solution. The reaction product is then separated by filtration and washed with dionized water to remove salts generated during hydrolysis. The resulting filter cake can be dried in an oven or re-slurried with water and spray dried.

As noted above, the reaction product can then be calcined as desired over a wide range of time and temperature to enhance the properties of the resulting nanoparticles, such as by expanding or opening the pore structure and/or increasing the refractive index.

For best results the soluble titanium precursor compound is selected from titanium oxychloride (TiOCl$_2$), titanium oxybromide (TiOBr$_2$), titanium oxyiodide (TiOI$_2$), titanium oxynitrate (TiO(NO$_3$)$_2$), titanium trichloride (TiCl$_3$), titanium tribromide(TiBr$_3$), titanium oxalate (Ti$_2$(C$_2$O$_4$)$_3$), potassium hexafluorotitanate(K$_2$TiF$_6$), ammonium hexafluorotitanate ((NH$_4$)$_2$TiF$_6$), potassium titanyloxolate (K$_2$TiO(C$_2$O$_4$)$_2$), ammonium titanyloxolate ((NH$_4$)$_2$TiO(C$_2$O$_4$)$_2$), and titanium bis(ammonium lactate) dihydroxide ([CH$_3$CH(O)COONH$_4$]$_2$Ti(OH)$_2$). Other commercially available soluble titanium precursor compounds can be deployed in the process and produce satisfactory results and, although not specifically named herein, they are embraced within the described and claimed inventive concept(s).

As noted above, morphology controlling agents, or mixtures thereof, for carrying out the inventive concept(s) include (i) α-hydroxy carboxylic acids of the formula R—CH(OH)COOH, (ii) α-hydroxy carboxamides of the formula R—CH(OH)CONH$_2$, and (iii) α-amino acids of the formula R—CH(NH$_2$)COOH, wherein R is an alkane, alkene, alkyne, arene, or cycloalkane group having 6 or more carbon atoms. Examples of such morphology controlling agents include, but are not limited to, mandelic acid (C$_6$H$_5$CH(OH)COOH); 4-hydroxymandelic acid (C$_6$H$_4$(OH)CH(OH)COOH); benzilic acid ((C$_6$H$_5$)$_2$C(OH)COOH); 2-hydroxy-4-phenylbutyric acid (C$_6$H$_5$CH$_2$CH$_2$CH(OH)COOH); 2-hydroxy-2-phenylpropionic acid ((C$_6$H$_5$)(CH$_3$)C(OH)COOH); 2-hydroxyoctanoic acid (CH$_3$CH$_2$CH$_2$CH$_2$CH$_2$CH$_2$CH(OH)COOH); mandelamide (C$_6$H$_5$CH(OH)CONH$_2$); phenylalanine (C$_6$H$_5$CH$_2$CH(NH$_2$)COOH); and tyrosine (C$_6$H$_4$(OH)

$CH_2CH(NH_2)COOH$). In addition, the ammonium ($NH_4+$), sodium ($Na+$) and potassium ($K+$) salts of such acids and carboxamides can also be used.

In a preferred embodiment of the invention, the morphology controlling agent is mandelic acid ($C_6H_5CH(OH)COOH$), and the soluble titanium compound is titanium oxychloride ($TiOCl_2$).

The process of the invention produces novel rutile $TiO_2$ nanoparticles, i.e., the reaction product comprises ordered acicular aggregates of elongated, i.e., rod-like, $TiO_2$ crystallites. The individual crystallites have a thickness in the range of from 3 nm to 5 nm, and one end of each of the rod-like crystallites are joined, i.e., assembled, into a cluster such that the opposite ends of each of the crystallites extend, or fan, outwardly in the general shape of a nano-sized flower bouquet or a funnel. The funnel-shaped structures have a diameter in the range of 50 nm and a height in the range of from 50 nm to 100 nm. The rutile $TiO_2$ nanoparticles in powder form show a desirably high specific surface area and pore volume. It is preferred that specific surface area be in the range from 120 $m^2/g$ to 160 $m^2/g$ and that pore volume be in the range from 0.3 $cm^3/g$ to 0.5 $cm^3/g$ or higher.

EXAMPLES

The present invention will be illustrated in further detail with reference to the working examples which follow and FIGS. 1-8. It should be noted, however, that these examples should not be construed to limit the scope of the described and claimed inventive concept(s).

Example 1

Preparation of Funnel-Shaped Nanoparticles Using Carboxylic Acids 1,255 g of deionized water, 9.5 g of mandelic acid (from Alfa Aesar), 97 g HCl solution (37% from Fisher Scientific), and 397 g of titanium oxychloride solution (25.2% in $TiO_2$, from Millennium Inorganic Chemicals) were mixed together in a heated reactor equipped with a glass condenser and an overhead stirrer. While being constantly stirred, the mixture was heated to 65° C. A $TiO_2$ seed slurry containing 0.2 g $TiO_2$ in anatase phase (from Millennium Inorganic Chemicals) was added, and the hydrolysis reaction was maintained at 65° C. for 2 hours. During this period, $TiO_2$ particles were formed and crystallized through hydrolysis of the titanium oxychloride precursor compound. The reaction temperature was then increased to 103° C., and that temperature was maintained for 4 hours. The hydrolysis was essentially complete at this stage.

The resulting reaction mixture was then cooled to room temperature and transferred to a different container where the particles formed were allowed to settle for a few hours. After essentially all of the particles were observed to have settled to the bottom of the container, the mother liquor, i.e., liquid reaction medium, was removed and about the same volume of fresh deionized water was added to the container. The reaction mixture was then stirred to re-slurry the particles, and then the pH of the slurry was increased to a value of about 7 by slow addition of an ammonia solution (~29%, Fisher Scientific). The particles comprising the reaction product were then separated from the liquid reaction mixture using a Buchner filter and washed with deionized water until the conductivity of the filtrate was lowered to about 500 µS/cm. The wet filter cake sample was then stored as a slurry by re-slurrying the filter cake with a small amount of deionized water. The powder form of the sample was obtained by drying the slurry sample in an oven overnight at 90° C. X-ray Diffraction (XRD) measurement on the powder sample, shown in FIG. 5, indicates that the sample contains 100% rutile with crystallite size about 8 nm. BET measurement on the powder sample shows that the powder has a specific surface area of 140 $m^2/g$ and a pore volume of 0.34 $cm^3/g$.

Figure 1:
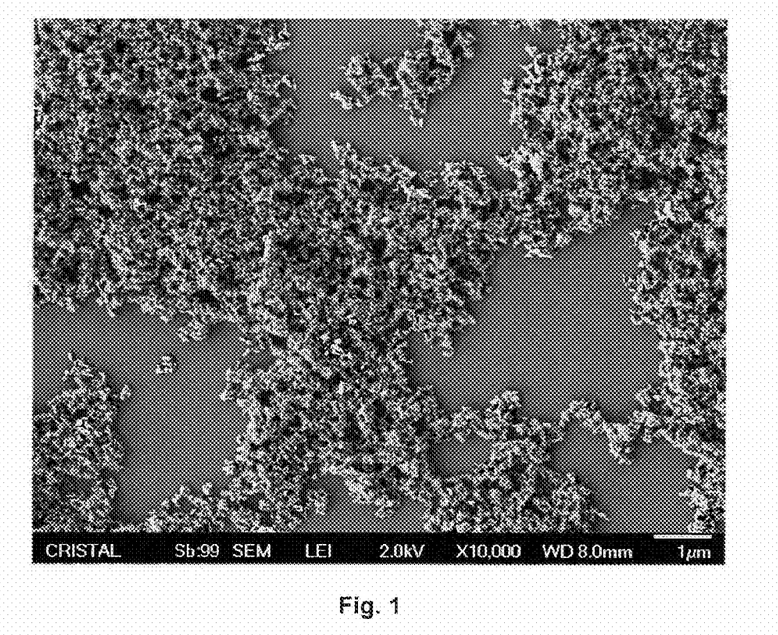
FIG. 1 is an SEM (Scanning Electron Microscopy) image of funnel-shaped rutile TiO$_2$ nanoparticles according to the invention.

SEM images of the slurry sample are shown in FIG. 1 at a magnification of 10,000. Funnel-shaped nanoparticles can be seen more clearly in FIG. 2 at a magnification of 50,000. The TEM image of the slurry sample shown in FIG. 3 illustrates a funnel-shaped particle with a diameter in the range of 50 nm. The TEM image in FIG. 4. illustrates general alignment of individual nano-sized rutile $TiO_2$ crystallites.

Figure 2:
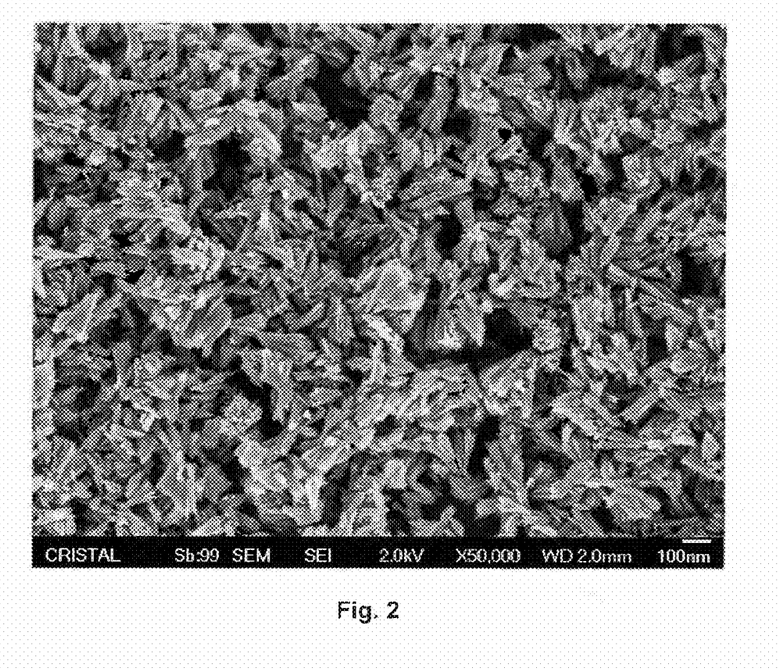
FIG. 2 is an enlarged SEM image which illustrates in more detail ordered acicular aggregates of elongated TiO$_2$ crystallites according to the invention.
Figure 3:
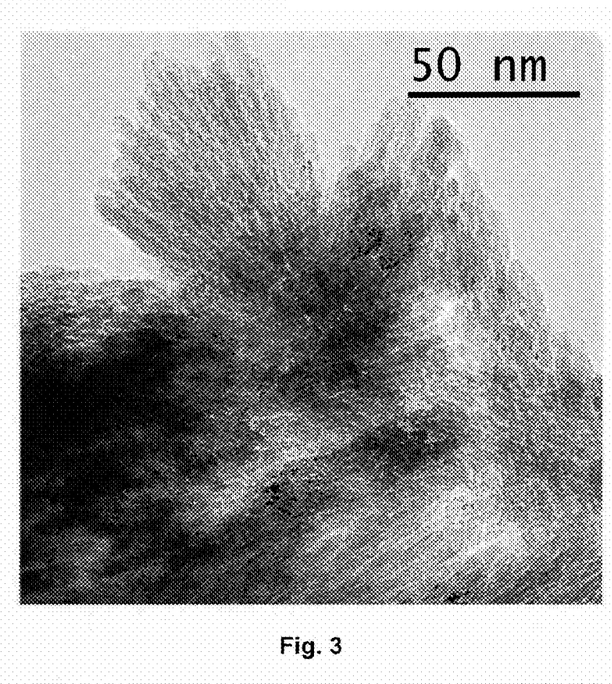
FIG. 3 is a TEM (Transmission Electron Microscopy) image of funnel-shaped rutile TiO$_2$ nanoparticles according to the invention.
Figure 4:
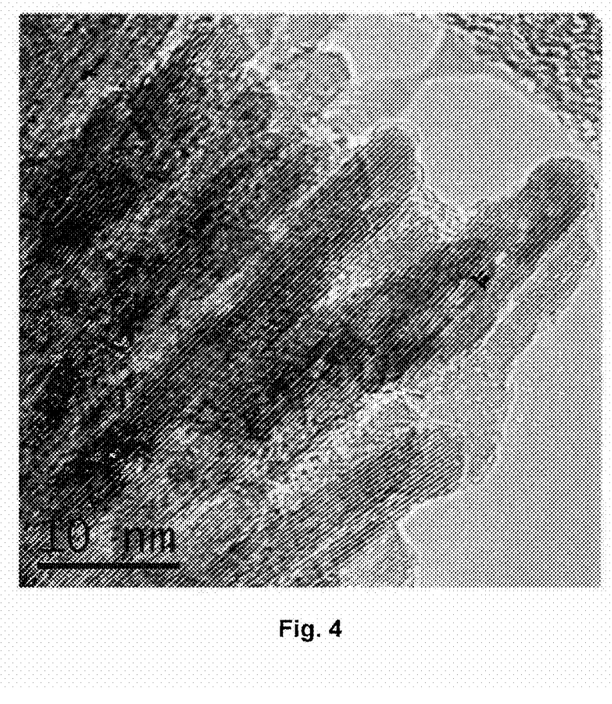
FIG. 4 is an enlarged TEM image of funnel-shaped rutile TiO$_2$ nanoparticles according to the invention.
Figure 5:
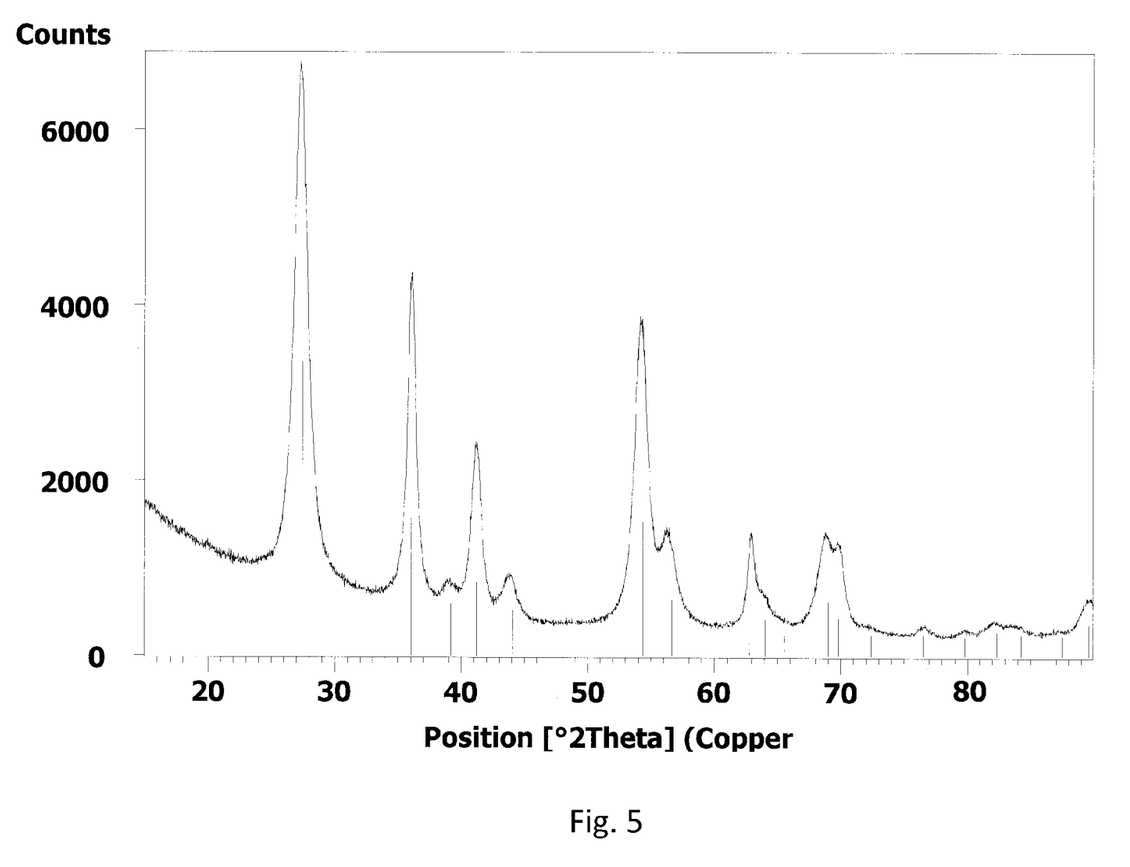
FIG. 5 is an X-ray diffraction (XRD) pattern of the funnel-shaped rutile TiO$_2$ nanoparticles produced according to Example 1 and shown in FIG. 1.
Figure 6:
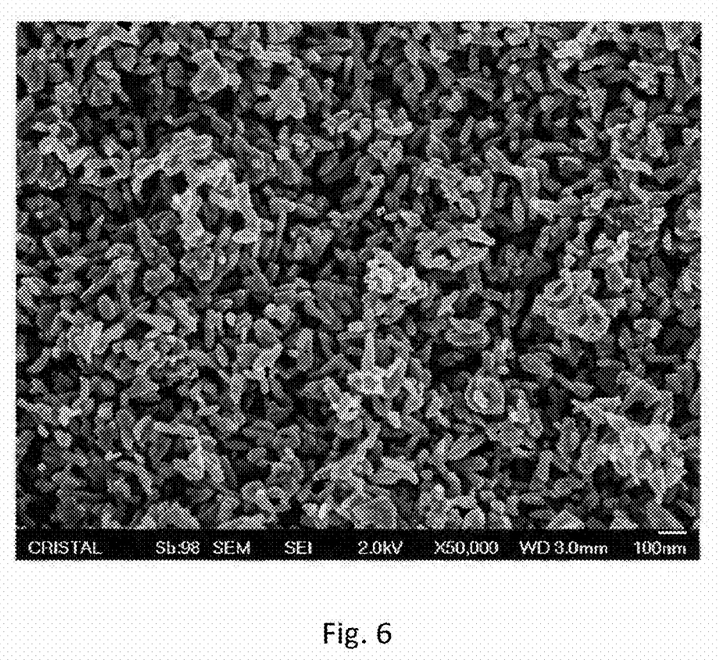
FIG. 6 is an SEM image of the shaped rutile TiO$_2$ nanoparticles shown in FIG. 1 after calcining at 550° C. for 6 hours.
Figure 7:
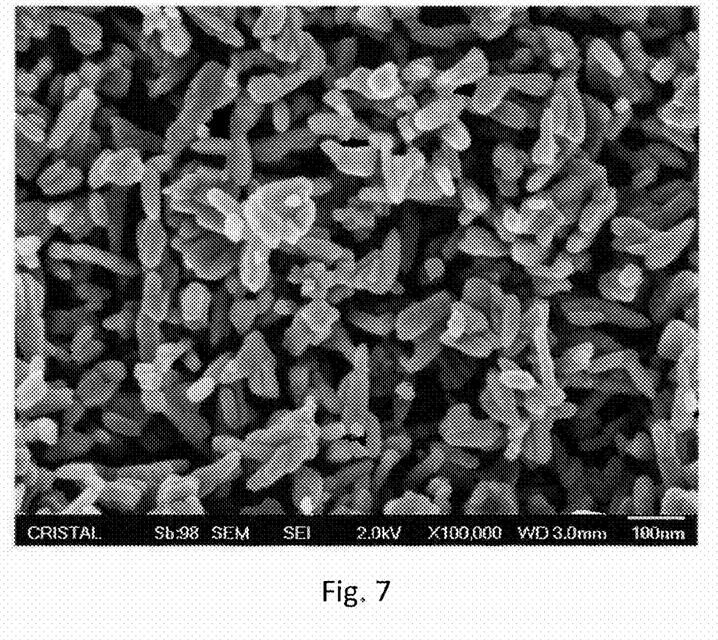
FIG. 7 is an enlarged SEM image of the shaped rutile TiO$_2$ nanoparticles shown in FIG. 6.
Figure 8:
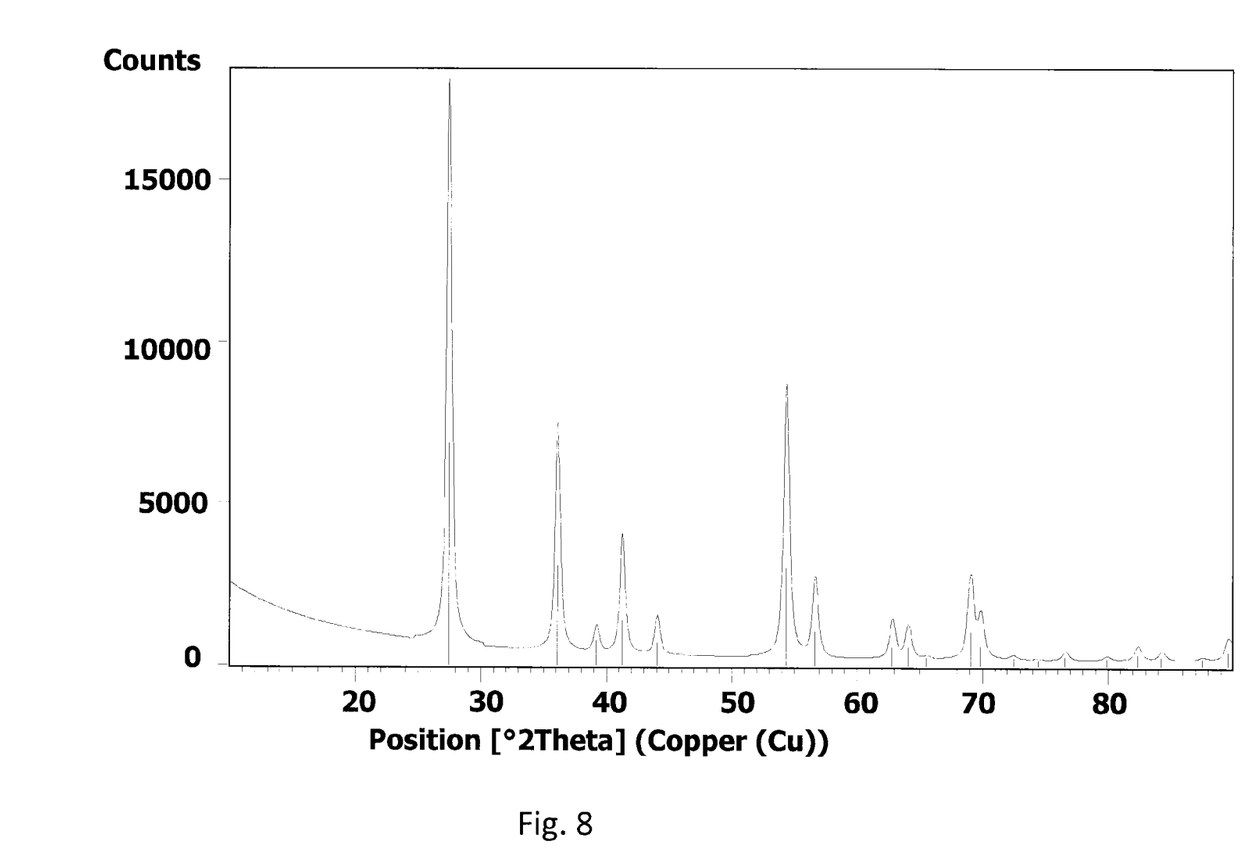
FIG. 8 is an X-ray diffraction (XRD) pattern of the calcined rutile TiO$_2$ nanoparticles shown in FIG. 6 which confirms that the rutile phase is present.

The funnel-shaped nanoparticles shown in FIG. 2 were calcined at 550° C. for 6 hours. SEM images of the calcined nanoparticles can be seen in FIG. 6 (50,000 magnification) and in FIG. 7 (100,000 magnification). Calcining, which can be adjusted for time and temperature, operates to enhance the properties of the resulting nanoparticles by expanding or opening the pore structure and/or increasing the refractive index.

Example 2

Preparation of Funnel-Shaped Nanoparticles Using Amino Acids

The same procedure was followed as in Example 1 except that 20.7 g phenylalanine (Alfa Aesar) was used as morphology controlling agent instead of mandelic acid. The SEM/TEM images of the reaction product were similar to those shown in FIGS. 1-4. XRD measurement on the powder sample indicates that the sample contains 100% rutile with crystallite size of about 9 nm. BET measurement on the powder sample shows that the powder has a specific surface area of 124 $m^2/g$ and a pore volume of 0.37 $cm^3/g$.

Example 3

Preparation of Funnel-Shaped Nanoparticles Using Carboxylic Acids

The same procedure was followed as in Example 1, except that 14.3 g of benzilic acid (Alfa Aesar) was used as the morphology controlling agent instead of mandelic acid. The SEM/TEM images of the reaction product are similar to those shown in FIGS. 1-4. The XRD measurement of the powder sample was similar to the measurement shown in FIG. 5 for the funnel-shaped nanoparticles produced using mandelic acid and confirms that the sample contains 100% rutile with crystallite size of about 8 nm. BET measurement on the powder sample shows that the powder has a specific surface area of 121 $m^2/g$ and a pore volume of 0.53 $cm^3/g$.

What is claimed is:

1. A method for preparing calcined rutile $TiO_2$ nanoparticles from rutile $TiO_2$ nanoparticles which are aggregates of elongated $TiO_2$ crystallites comprising:
   (a) forming an aqueous solution of a soluble titanium compound at a titanium concentration of from 0.5 to 1.0 moles per liter, optionally in the presence of a mineral acid;
   (b) introducing a morphology controlling agent or a mixture of said morphology controlling agents selected from (i) an a-hydroxy carboxylic acid of the formula R—CH(OH)COOH, (ii) an a-hydroxy carboxamide of the formula R—CH(OH)CONH$_2$ or (iii) an α-amino acid of the formula R—CH(NH$_2$)COOH, wherein said R group in each formula is an alkane, alkene, alkyne, arene, or cycloalkane group having 6 or more carbon atoms, into the solution at an acid- or carboxamide-to-titanium molar ratio of from 0.02 to 0.2 while simultaneously heating the solution to a temperature in the range of from 60° C. to 80° C. with constant stirring;
(c) introducing TiO$_2$ seeds into the stirred solution at a seed-to-TiO$_2$ molar ratio of from 0.0005 to 0.0015 and maintaining the stirred solution including said TiO$_2$ seeds at a temperature in the range of from 60° C. to 80° C. for a period of from one to 3 hours;
(d) elevating the temperature of the stirred solution from step (d) to a value of from 100° C. to the refluxing temperature of the aqueous solution and maintaining said temperature for a period of from 2 hours to 4 hours to form a reaction product;
(e) cooling the reaction mixture which results from step (e) to room or ambient temperature;
(f) optionally neutralizing the reaction mixture;
(g) separating and drying the reaction product; and
(h) calcining the reaction product.

2. The method of claim 1 wherein said elongated TiO$_2$ crystallites have a thickness of from 3 nm to 5 nm and a length of from 20 nm to 50 nm.

3. The method of claim 2 wherein said rutile TiO$_2$ nanoparticles are aggregates wherein one set of ends of said elongated TiO$_2$ crystallites of each aggregate are joined in a cluster and the opposite ends of said crystallites fan outwardly in the shape of a funnel wherein said funnel has a diameter at its widest part of about 50 nm and a height in the range of from 50 nm to 100 nm.

4. The method of claim 1 wherein said morphology controlling agent is selected from mandelic acid (C$_6$H$_5$CH(OH)COOH); 4-hydroxymandelic acid (C$_6$H$_4$(OH)CH(OH)COOH); benzilic acid ((C$_6$H$_5$)$_2$C(OH)COOH); 2-hydroxy-4-phenylbutyric acid (C$_6$H$_5$CH$_2$CH$_2$CH(OH)COOH); 2-hydroxy-2-phenylpropionic acid ((C$_6$H$_5$)(CH$_3$)C(OH)COOH); 2-hydroxyoctanoic acid (CH$_3$CH$_2$CH$_2$CH$_2$CH$_2$CH$_2$CH(OH)COOH); mandelamide (C$_6$H$_5$CH(OH)CONH$_2$); phenylalanine (C$_6$H$_5$CH$_2$CH(NH$_2$)COOH); tyrosine (C$_6$H$_4$(OH)CH$_2$CH(NH$_2$)COOH); ammonium (NH$_4$+), sodium (Na+) and potassium (K+) salts of said morphology controlling agents; and mixtures of said morphology controlling agents.

5. The method of claim 1 wherein said soluble titanium compound is selected from titanium oxychloride (TiOCl$_2$), titanium oxybromide (TiOBr$_2$), titanium oxyiodide (TiOI$_2$), titanium oxynitrate (TiO(NO$_3$)$_2$), titanium trichloride (TiCl$_3$), titanium tribromide(TiBr$_3$), titanium oxalate (Ti$_2$(C$_2$O$_4$)$_3$), potassium hexafluorotitanate(K$_2$TiF$_6$), ammonium hexafluorotitanate ((NH$_4$)$_2$TiF$_6$), potassium titanyloxolate (K$_2$TiO(C$_2$O$_4$)$_2$), ammonium titanyloxolate ((NH$_4$)$_2$ TiO(C$_2$O$_4$)$_2$), titanium bis(ammonium lactate) dihydroxide ([CH$_3$CH(O)COONH$_4$]$_2$Ti(OH)$_2$) and mixtures thereof.

6. The method of claim 4 wherein said soluble titanium compound is selected from titanium oxychloride (TiOCl$_2$), titanium oxybromide (TiOBr$_2$), titanium oxyiodide (TiOI$_2$), titanium oxynitrate (TiO(NO$_3$)$_2$), titanium trichloride (TiCl$_3$), titanium tribromide(TiBr$_3$), titanium oxalate (Ti$_2$(C$_2$O$_4$)$_3$), potassium hexafluorotitanate(K$_2$TiF$_6$), ammonium hexafluorotitanate ((NH$_4$)$_2$TiF$_6$), potassium titanyloxolate (K$_2$TiO(C$_2$O$_4$)$_2$), ammonium titanyloxolate ((NH$_4$)$_2$ TiO(C$_2$O$_4$)$_2$), titanium bis(ammonium lactate) dihydroxide ([CH$_3$CH(O)COONH$_4$]$_2$Ti(OH)$_2$) and mixtures thereof.

7. The method of claim 6 wherein said morphology controlling agent is mandelic acid (C$_6$H$_5$CH(OH)COOH), said soluble titanium compound is titanium oxychloride (TiOCl$_2$), and said TiO$_2$ seeds comprise a slurry containing 0.2 g TiO$_2$ in anatase phase.

8. The method of claim 7 wherein said morphology controlling agent is phenylalanine (C$_6$H$_5$CH$_2$CH(NH$_2$)COOH), said soluble titanium compound is titanium oxychloride (TiOCl$_2$), and said TiO$_2$ seeds comprise a slurry containing 0.2 g TiO$_2$ in anatase phase.

9. Calcined rutile TiO$_2$ nanoparticles which are produced by calcining rutile TiO$_2$ nanoparticles which are ordered acicular aggregates of elongated TiO$_2$ crystallites having a thickness in the range of from 3 nm to 5 nm in which one end of each of said elongated TiO$_2$ crystallites are joined into a cluster such that the opposite ends of each of said elongated TiO$_2$ crystallites extend outwardly in the shape of a nano-sized funnel structure having a diameter of about 50 nm and a height in the range of from 50 nm to 100 nm.

10. The calcined rutile TiO$_2$ nanoparticles of claim 9 which are produced by the process of:
(a) forming an aqueous solution of a soluble titanium compound at a titanium concentration of from 0.5 to 1.0 moles per liter;
(b) introducing a morphology controlling agent or a mixture of said morphology controlling agents selected from (i) an α-hydroxy carboxylic acid of the formula R—CH(OH)COOH, (ii) an α-hydroxy carboxamide of the formula R—CH(OH)CONH$_2$ or (iii) an α-amino acid of the formula R—CH(NH$_2$)COOH, wherein said R group in each formula is an alkane, alkene, alkyne, arene, or cycloalkane group having 6 or more carbon atoms, into the solution at an acid- or carboxamide-to-titanium molar ratio of from 0.02 to 0.2 while simultaneously heating the solution to a temperature in the range of from 60° C. to 80° C. with constant stirring;
(c) introducing TiO$_2$ seeds into the stirred solution at a seed to TiO$_2$ molar ratio of from 0.0005 to 0.0015 while maintaining the solution including said TiO$_2$ seeds at a temperature in the range of from 60° C. to 80° C. for a period of from one to 3 hours;
(d) elevating the temperature of the stirred solution from step (d) to a value of from 100° C. to the refluxing temperature of the aqueous solution and maintaining said temperature for a period of from 2 hours to 4 hours to form a reaction product;
(e) cooling the reaction mixture which results from step (e) to room or ambient temperature;
(f) optionally neutralizing the reaction mixture;
(g) separating and drying the reaction product; and
(h) calcining the reaction product.

11. The calcined rutile TiO$_2$ nanoparticles of claim 10 wherein:
(a) said morphology controlling agent is selected from mandelic acid (C$_6$H$_5$CH(OH)COOH); 4-hydroxymandelic acid (C$_6$H$_4$(OH)CH(OH)COOH); benzilic acid ((C$_6$H$_5$)$_2$C(OH)COOH); 2-hydroxy-4-phenylbutyric acid (C$_6$H$_5$CH$_2$CH$_2$CH(OH)COOH); 2-hydroxy-2-phenylpropionic acid ((C$_6$H$_5$)(CH$_3$)C(OH)COOH); 2-hydroxyoctanoic acid (CH$_3$CH$_2$CH$_2$CH$_2$CH$_2$CH$_2$CH(OH)COOH); mandelamide (C$_6$H$_5$CH(OH)CONH$_2$); phenylalanine (C$_6$H$_5$CH$_2$CH(NH$_2$)COOH); tyrosine (C$_6$H$_4$(OH)CH$_2$CH(NH$_2$)COOH); and ammonium (NH$_4$+), sodium (Na+) and potassium (K+) salts thereof and mixtures thereof, and (b) said soluble titanium compound is selected from titanium oxychloride ($TiOCl_2$), titanium oxybromide ($TiOBr_2$), titanium oxyiodide ($TiOI_2$), titanium oxynitrate ($TiO(NO_3)_2$), titanium trichloride ($TiCl_3$), titanium tribromide($TiBr_3$), titanium oxalate ($Ti_2(C_2O_4)_3$), potassium hexafluorotitanate($K_2TiF_6$), ammonium hexafluorotitanate (($NH_4)_2TiF_6$), potassium titanyloxolate ($K_2TiO(C_2O_4)_2$), ammonium titanyloxolate (($NH_4)_2\ TiO(C_2O_4)_2$), titanium bis(ammonium lactate) dihydroxide ($[CH_3CH(O)COONH_4]_2Ti(OH)_2$) and mixtures thereof.

12. The calcined rutile $TiO_2$ nanoparticles of claim 10 wherein:
  (a) said morphology controlling agent is selected from phenylalanine ($C_6H_5CH_2CH(NH_2)COOH$) and mandelic acid ($C_6H_5CH(OH)COOH$) or a mixture thereof; and
  (b) said soluble titanium compound is titanium oxychloride ($TiOCl_2$).

\* \* \* \* \*